US012565936B2

(12) United States Patent
Zhang

(10) Patent No.: US 12,565,936 B2
(45) Date of Patent: Mar. 3, 2026

(54) MULTIFUNCTIONAL FILTER VALVE

(71) Applicant: Zhengzhou Kangrun Fluid Equipment Co., LTD., Zhengzhou City (CN)

(72) Inventor: Kefeng Zhang, Zhengzhou City (CN)

(73) Assignee: ZHENGZHOU KANGRUN FLUID EQUIPMENT CO., LTD., Zhengzhou City (CN)

( * ) Notice: Subject to any disclaimer, the term of this patent is extended or adjusted under 35 U.S.C. 154(b) by 375 days.

(21) Appl. No.: 18/387,075

(22) Filed: Nov. 6, 2023

(65) Prior Publication Data

US 2024/0167574 A1 May 23, 2024

(30) Foreign Application Priority Data

Nov. 23, 2022 (CN) .......................... 202211473374.6

(51) Int. Cl.
*F16K 11/07* (2006.01)
*B01D 36/00* (2006.01)
*F16K 11/074* (2006.01)

(52) U.S. Cl.
CPC .......... *F16K 11/074* (2013.01); *B01D 36/008* (2013.01); *B01D 2201/165* (2013.01)

(58) Field of Classification Search
CPC ................ F16K 11/074; B01D 36/008; B01D 2201/165
See application file for complete search history.

(56) References Cited

U.S. PATENT DOCUMENTS

| | | | | |
|---|---|---|---|---|
| 2004/0069968 A1* | 4/2004 | Gillen | ................... | F16K 5/0642 |
| | | | | 251/315.14 |
| 2005/0211315 A1* | 9/2005 | Jorg | .................... | F16K 27/0263 |
| | | | | 137/625.47 |
| 2011/0233437 A1* | 9/2011 | Mattson | .............. | F16K 11/0853 |
| | | | | 251/309 |
| 2015/0226343 A1* | 8/2015 | Jenks | ................. | F16K 11/0873 |
| | | | | 137/625.46 |

FOREIGN PATENT DOCUMENTS

CA          2305361 C  * 12/2003  .......... F16K 11/0743

* cited by examiner

*Primary Examiner* — Youngsul Jeong
(74) *Attorney, Agent, or Firm* — WPAT, PC

(57) ABSTRACT

A multifunctional filter valve is provided. The multifunctional filter valve includes a valve body, a rotatable valve plate, a fixed valve plate, and a driving device. A water inlet, a water outlet, and a drainage outlet are disposed on a side wall of the valve body. The water outlet is configured to connect to a valve. An inner chamber and an outer chamber are defined in the valve body. The inner chamber defines a central drainage chamber, a working chamber, a backward washing chamber, and a blind chamber. A first filter element interface and a second filter element interface are defined at a bottom of the valve body. The combination of fixed valve plate and rotatable valve plate achieves a normal operation mode, a backward washing mode, and a forward washing mode. The multifunctional filter valve has a simpler structure and lower production cost.

9 Claims, 8 Drawing Sheets

MULTIFUNCTIONAL FILTER VALVE

TECHNICAL FIELD

The disclosure relates to the technical field of valves for water treatment, and particularly to a multifunctional filter valve.

BACKGROUND

In recent years, as more and more control valves with flat sealing structures are used in the field of water treatment, plane valves are popular in the market. At present, an industrial or civil water treatment system mostly uses a control valve body to switch a flow passage, and the control valve of a filtration system needs to realize the functions including filtration, backward washing, forward washing and so on. Non-filtration processes such as backward washing and forward washing of the filtration system are collectively referred to as washing processes. Existing water treatment filter valves mainly change a direction of water flow to achieve functions including normal operation, backward washing and forward washing. The filter valves are generally used in industrial water treatment equipment such as carbon filters and sand filters, and are widely used in household water treatment equipment to remove impurities, residual chlorine, heavy metals and so on, thereby improving water quality.

A Chinese application with the application number of CN202211072848.6 (with a publication number of CN115183015A) discloses a multifunctional filter valve for water treatment. The multifunctional filter valve includes a valve body, a rotatable valve plate, a fixed valve plate, and a driving device. A side wall of the valve body is provided with a water inlet, a water outlet, and a drainage outlet. A working chamber, a forward washing chamber, and a backward washing chamber are disposed in the valve body. A bottom of the valve body is provided with a third filter element interface, a second filter element interface, and a first filter element interface corresponding to the chambers. The driving device drives the rotatable valve plate to match with the fixed valve plate for achieving the functions of backward washing and forward washing. In the above technical solution, the valve body is provided with the working chamber, the forward washing chamber, the backward washing chamber, and three filter element interfaces corresponding to the chambers, resulting in a relatively complex internal structure of the valve body. Moreover, in order to achieve the functions of normal operation, backward washing and forward washing, the structure of the fixed valve plate is also relatively complex, which undoubtedly increases production costs.

Correspondingly, a multifunctional filter valve is needed to better optimize existing filter valves.

SUMMARY

The disclosure provides a multifunctional filter valve, which solves the problem of production costs caused by the complex internal structure of filter valves in the related art.

The technical solution of the disclosure is as follows. A multifunctional filter valve is provided, and the multifunctional filter valve includes a valve body, a rotatable valve plate, and a driving device. A water inlet, a water outlet, and a drainage outlet are disposed on a side wall of the valve body. The water outlet is configured to connect to a valve when in use.

Furthermore, an inner chamber and an outer chamber are coaxially defined in the valve body, and the internal chamber is disposed to separate from the outer chamber. The outer chamber is connected to (i.e., in communication with) the water inlet. The inner chamber includes a central drainage chamber, a working chamber, a backward washing chamber, and a blind chamber. The working chamber, the backward washing chamber, and the blind chamber are distributed circumferentially around the central drainage chamber; the central drainage chamber is connected to the drainage outlet. The backward washing chamber is connected to the water outlet. A first filter element interface and a second filter element interface are coaxially disposed at a bottom of the valve body. The first filter element interface is connected to the working chamber. The second filter element interface is connected to the backward washing chamber.

The rotatable valve plate is coaxially disposed above the inner chamber coaxially. The driving device is connected to the rotatable valve plate and is configured to drive the rotatable valve plate to rotate in the valve body. A center of the rotatable valve plate is provided with a central blind hole. A water inlet through hole, a drainage blind hole in an annular sector shape, and a flow blocking part in an annular sector shape are distributed circumferentially around the central blind hole of the rotatable valve plate. The drainage blind hole and the flow blocking part are coaxial with the central blind hole. The central blind hole is connected to the central drainage chamber. The drainage blind hole is connected to the central blind hole. A central angle of the drainage blind hole is not greater than a central angle of the blind chamber. A central angle of the flow blocking part is equal to a central angle of the water inlet through hole, a central angle of the working chamber, and a central angle of the backward washing chamber.

Beneficial effects of the disclosure: The multifunctional filter valve of the disclosure can design an effective area of the water inlet and the water outlet holes in the valve body as needed under the condition of the maximum water flow area provided by the valve body. Compared with the technical solution mentioned in the background, the disclosure reduces the cost of one filter interface and optimizes the setting of the fixed valve plate by combining the working chamber, the backward washing chamber, the blind chamber, and the rotatable valve plate, while achieving the same filtering function. The internal structure of the valve body of the disclosure is simplified, which reduces production costs and is more conducive to use.

In an embodiment, the flow blocking part includes a first blind hole, a second blind hole, a first separation beam disposed between the first blind hole and the second blind hole, and a second separation beam disposed between the first blind hole and the drainage blind hole. A central angle of the second blind hole is equal to the central angle of the drainage blind hole.

Beneficial effects of the disclosure: By setting blind holes on the flow blocking part, flow resistance can be provided by using the separation beams between the blind holes, the material consumption of the rotatable valve plate can be reduced, thereby reducing production costs.

In an embodiment, the multifunctional filter valve further includes a fixed valve plate, and the fixed valve plate is coaxially fixed at a top of the inner chamber. The rotatable valve plate is disposed above the fixed valve plate, and the rotatable valve plate is configured to rotate relative to the fixed valve plate to match the fixed valve plate. A central through hole is defined at a center of the fixed valve plate; a first through hole in an annular sector shape, a second through hole in an annular sector shape, and a blind plate in an annular sector shape are coaxially disposed around the central through hole. The central through hole is connected to the central drainage chamber. The first through hole is connected to the first filter element interface. The second through hole is connected to the second filter element interface. A central angle of the blind plate is equal to the central angle of the blind chamber, and the blind plate is disposed to correspond to the blind chamber in position.

Beneficial effects of the disclosure: The fixed valve plate is matched with the rotatable valve plate to realize the change of the flow path of water, thereby avoiding the abrasion of an end surface of the inner chamber caused by direct matching between the rotatable valve plate and the inner chamber. The disclosure reduces maintenance and replacement.

In an embodiment of the disclosure, a horizontal sectional area of the first through hole is equal to a horizontal sectional area of the water inlet through hole. A horizontal sectional area of the second through hole is equal to a horizontal sectional area of the flow blocking part. A horizontal sectional area of the blind plate is equal to a horizontal sectional area of the blind chamber.

Beneficial effects of the disclosure: An effective usage area of the water inlet through hole and an effective usage area of the first through hole on the fixed valve plate are the same. When the multifunctional filter valve operates normally, raw water passing through the water inlet through hole can enter a tank body from the first through hole of the fixed valve plate without mass loss. When the raw water is filtered, water can be directly discharged from the water outlet of the valve body without passing through the fixed valve plate, which reduces the flow path of water and improves drainage efficiency.

In an embodiment, the central angle of the blind plate is greater than 0° and less than 120°. A central angle of the first through hole is equal to a central angle of the second through hole, and the central angle of the first through hole is greater than 120° and less than 180°. A sum of the central angle of the blind plate, the central angle of the first through hole, and the central angle of the second through hole is 360°.

Beneficial effects of the disclosure: When the multifunctional filter valve operates normally for water filtration and purification, the multifunctional filter valve has a larger water inflow area, which can further reduce a volume of the valve body under the conditions of achieving the same filtration capacity and installation size (filter material tank size limit) compared with filter valves in the related art.

In an embodiment, the central angle of the blind plate is 60°, the central angle of the first through hole is 150°, and the central angle of the first through hole is 150°.

Beneficial effects of the disclosure: The multifunctional filter valve ensures sufficient water inflow and moderate drainage flow during forward washing and backward washing, thereby ensuring cleaning effectiveness.

In an embodiment, the water inlet through hole penetrates the rotatable valve plate along an axial direction of the valve body, and the water inlet through hole penetrates a circumferential surface of the rotatable valve plate along a radial direction of the valve body.

Beneficial effects of the disclosure: The disclosure can reduce the material consumption of the rotatable valve plate and save the production costs of the rotatable valve plate.

In an embodiment, the first through hole is disposed to correspond to the working chamber and the first filter element interface in position. The second through hole is disposed to correspond to the backward washing chamber and the second filter element interface in position.

Beneficial effects of the disclosure: After the raw water enters the water inlet, the raw water can directly enter the tank body or central pipe from corresponding through holes, chambers, and filter interfaces. Then water reaches the water outlet, which reduces the flow path of water and improves the working efficiency of the multifunctional filter valve.

BRIEF DESCRIPTION OF DRAWINGS

In order to more clearly illustrate the embodiments of the disclosure or the technical solutions in the related art, the following will briefly introduce the drawings used in the description of the embodiments or the related art. Apparently, the drawings in the following description are only some embodiments of the disclosure. For those of ordinary skill in the art, other drawings may also be derived from these drawings.

DESCRIPTION OF REFERENCE NUMERALS

Figure 1:
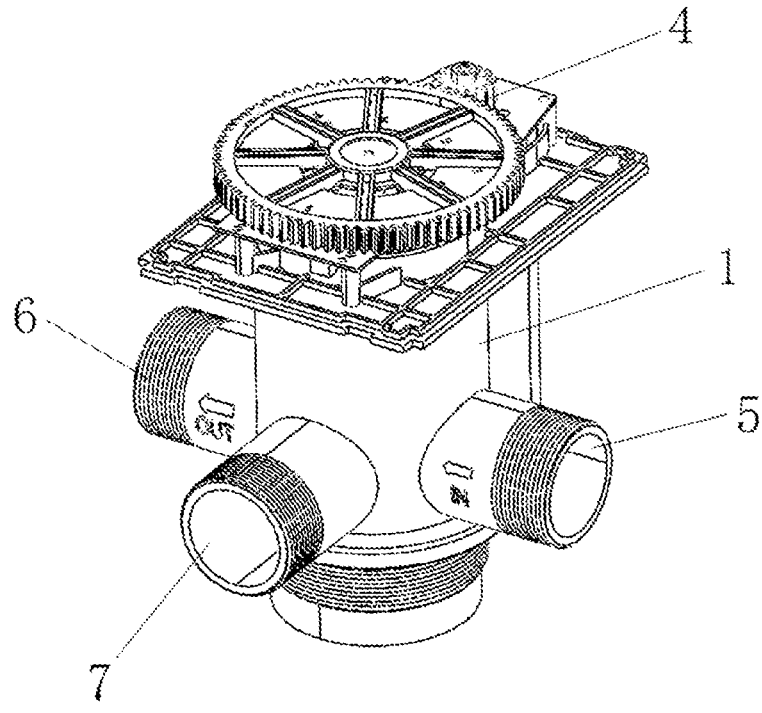
FIG. 1 illustrates a schematic diagram of an overall structure of a multifunctional filter valve of the disclosure.

1—valve body; 11—outer chamber; 12—central drainage chamber; 13—working chamber; 14—backward washing chamber; 15—blind chamber; 16—first filter element interface; 17—second filter element interface; 2—fixed valve plate; 21—support foot; 22—central through hole; 23—first through hole; 24—second through hole; 25—blind plate; 3—rotatable valve plate; 31—central blind hole; 32—water inlet through hole; 33—drainage blind hole; 34—first blind hole; 35—second blind hole; 36—first separation beam; 37—second separation beam; 4—driving device; 5—water inlet; 6—water outlet; 7—drainage outlet.

DETAILED DESCRIPTION OF EMBODIMENTS

The technical solutions in the embodiments of the disclosure will be clearly and completely described below in conjunction with the drawings in the embodiments of the disclosure. Apparently, the described embodiments are only a part of the embodiments, not all of the embodiments. Based on the embodiments of the disclosure, all other embodiments obtained by those of ordinary skill in the art without creative work are within the scope of the disclosure.

Embodiment 1

As shown in FIG. 1 to FIG. 12, a multifunctional filter valve provided by the disclosure includes a valve body 1 obtained by integral injection molding, a fixed valve plate 2 fixed in the valve body 1, a rotatable valve plate 3 rotatably assembled in the valve body 1, and a driving device 4 configured for driving the rotatable valve plate 3 to rotate. Specifically, the rotatable valve plate 3 is configured to rotate to match the fixed valve plate 2, and the rotatable valve plate is in a sealing fit with the fixed valve plate 2. A water inlet 5 and a water outlet 6 are disposed on two sides of the valve body in a radial direction. A drainage outlet 7 is disposed between the water inlet 5 and the water outlet 6 on the valve body 1. The water inlet 5 and the water outlet 6 are disposed coaxially. An axis line of the drainage outlet 7 is perpendicular to an axis line of the water inlet 5. When the multifunctional filter valve is in use, the water outlet 6 is connected to a valve. The driving device 4 is a common gear shift fork driving structure in the related art, and will not be detailed here.

Figure 2:
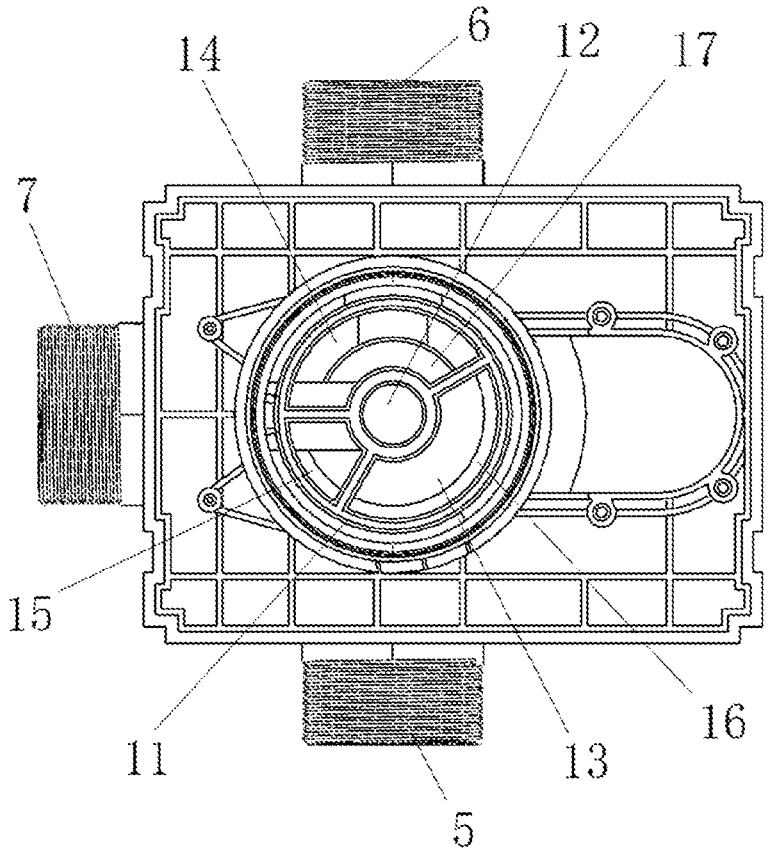
FIG. 2 illustrates a vertical view of an inner structure of a valve body of the multifunctional filter valve of the disclosure.
Figure 4:
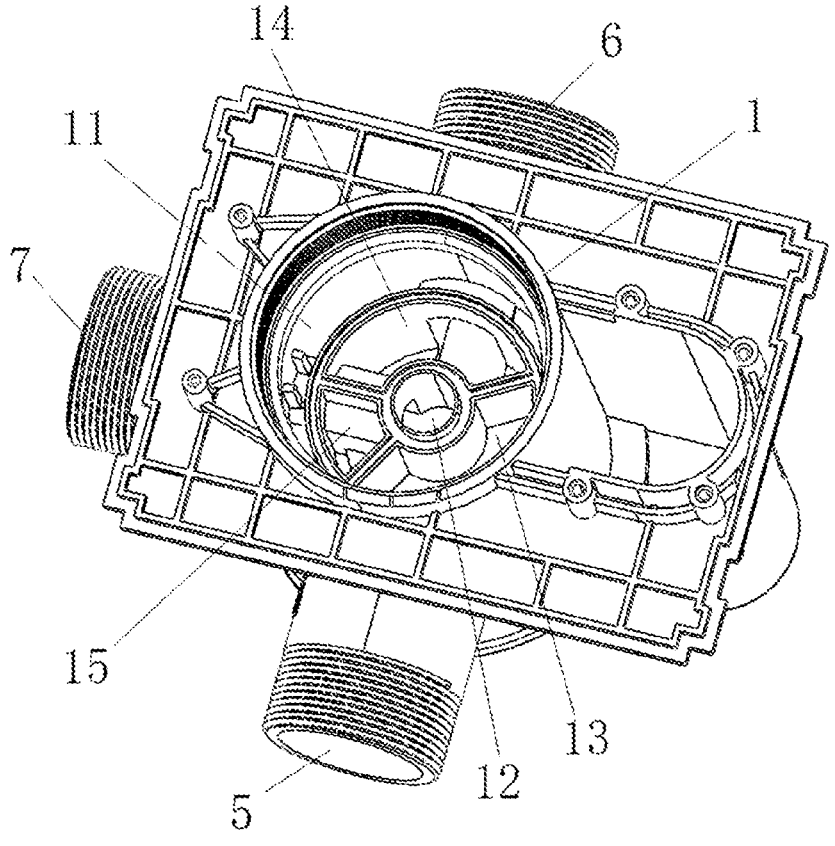
FIG. 4 illustrates a first perspective view of the inner structure of the valve body of the multifunctional filter valve of the disclosure.
Figures 5, 6:
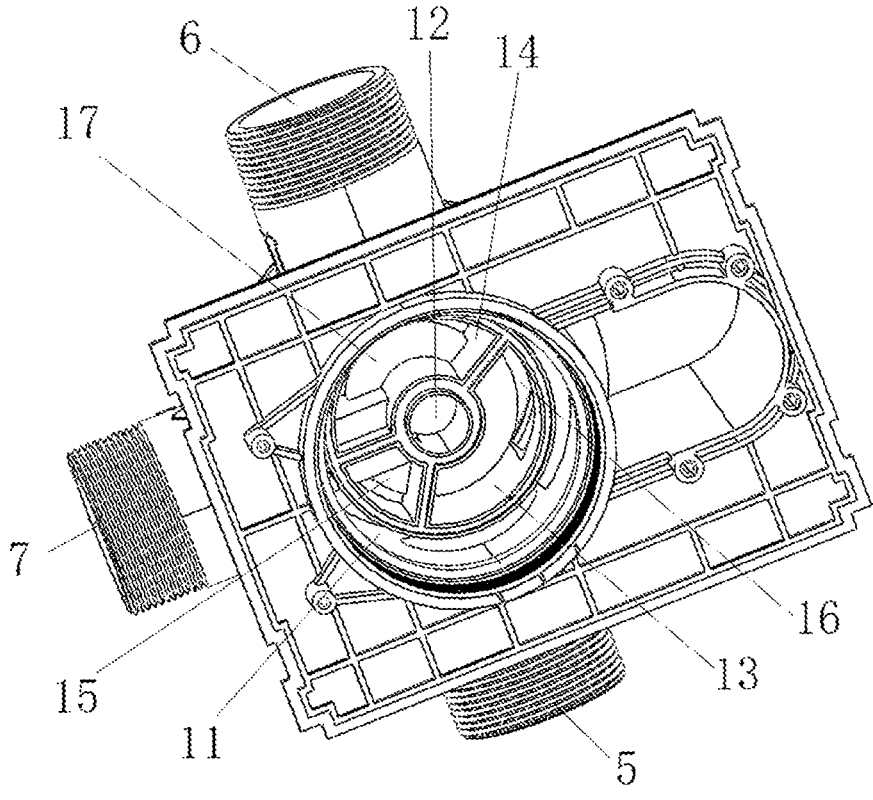
FIG. 5 illustrates a second perspective view of the inner structure of the valve body of the multifunctional filter valve of the disclosure.
FIG. 6 illustrates a schematic structural diagram of a fixed valve plate of the multifunctional filter valve of the disclosure.

As shown in FIG. 2, FIG. 4, and FIG. 5, an inner chamber and an outer chamber 11 are defined in the valve body 1 coaxially, and the internal chamber is disposed to separate from the outer chamber 11. Specifically, the outer chamber 11 is connected to the water inlet 5. A central drainage chamber 12 is provided in a center of the inner chamber, and the central drainage chamber 12 is connected to the water outlet 7. A working chamber 13, a backward washing chamber 14, and a blind chamber 15 are distributed circumferentially around the central drainage chamber in that order. Each of horizontal sections of the working chamber 13, the backward washing chamber 14, and the blind chamber 15 is in an annular sector shape. The working chamber 13, the backward washing chamber 14, and the blind chamber 15 are coaxial with the central drainage chamber 12. A central angle of the working chamber 13 is 150° which is equal to a central angle of the backward washing chamber 14. A central angle of the blind chamber 14 is equal to 60°. The backward washing chamber 14 is connected to the water outlet 6.

Figure 3:
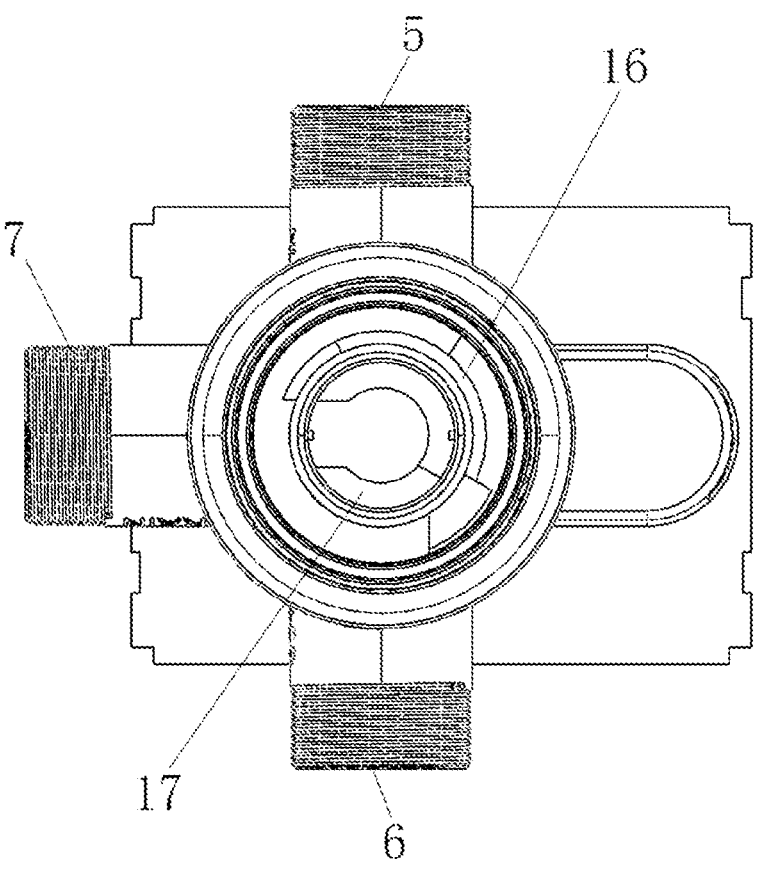
FIG. 3 illustrates a bottom view of a bottom structure of the valve body of the multifunctional filter valve of the disclosure

As shown in FIG. 2 and FIG. 3, a first filter element interface 16 and a second filter element interface 17 are defined at a bottom of the valve body 1. The second filter element interface 17 is located at a central position of the bottom of the valve body 1, and the second filter element interface 17 is connected to the backward washing chamber 14. The first filter element interface 16 is located at an outer side of the second filter element interface 17 in a radial direction and is disposed circumferentially around the second filter element interface 17. The first filter element interface 16 is connected to the working chamber 13. The first filter element interface 16 is coaxial with the second filter element interface 17.

Figure 7:
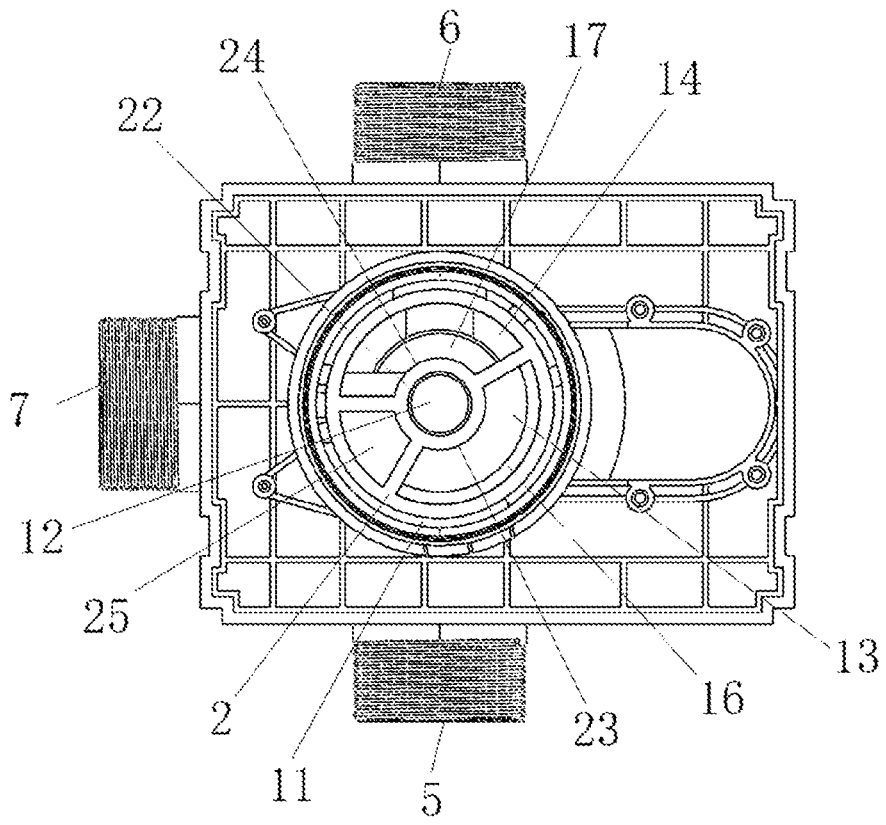
FIG. 7 illustrates an installation schematic diagram of the fixed valve plate in the valve body of the multifunctional filter valve of the disclosure.

As shown in FIG. 6 and FIG. 7, the fixed valve plate 2 is clamped in the valve body 1 through two pairs of support feet 21, and the fixed valve plate 2 is located at an upper part of the inner chamber. A horizontal sectional area of the fixed valve plate 2 except the support feet 21 is the same as that of the inner chamber. The fixed valve plate 2 is stacked at the upper part of the inner chamber and tightly matched with the inner chamber. A central through hole 22 is defined at a center of the fixed valve plate 2. A first through hole 23 in an annular sector shape, a second through hole 24 in an annular sector shape, and a blind plate 25 are disposed around the central through hole 22 coaxially. A central angle of the first through hole 23 is 150° and equal to a central angle of the second through hole 24. A central angle of the blind plate is 60°. A horizontal sectional area of the first through hole 23 is the same as that of the working chamber 13. A horizontal sectional area of the second through hole 24 is the same as that of the backward washing chamber 14, and the horizontal sectional area of the blind plate 25 is the same as that of the blind chamber 15.

When the fixed valve plate 2 is installed in the valve body 1, the central through hole 22 is connected to the central drainage chamber 12, the first through hole 23 is connected to the first filter element interface 16, the second through-hole 24 is connected to the second filter element interface 17, and the blind plate 25 is disposed to correspond to the blind chamber 15 in position.

Figure 8:
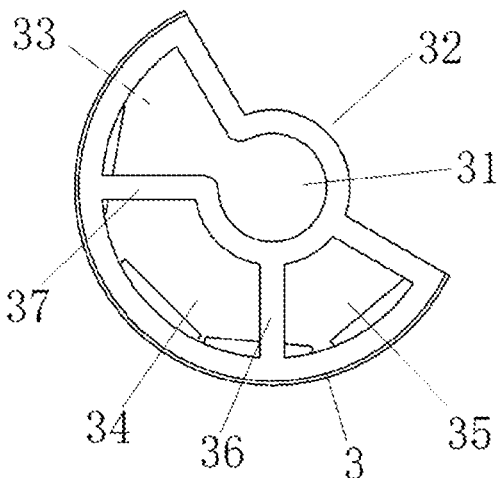
FIG. 8 illustrates a schematic structural diagram of a rotatable valve plate of the multifunctional filter valve of the disclosure.
Figure 9:
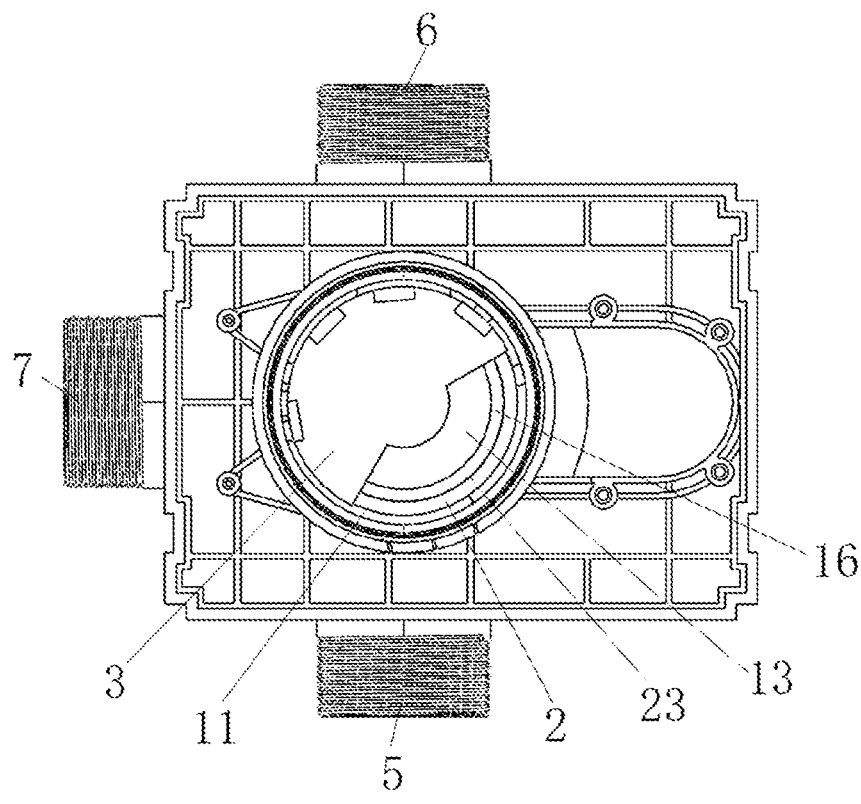
FIG. 9 illustrates an installation schematic diagram of the rotatable valve plate in the valve body of the multifunctional filter valve of the disclosure.

As shown in FIG. 8 and FIG. 9, a center of the rotatable valve plate 3 defines a central blind hole 31. A water inlet through hole 32, a drainage blind hole 33 in an annular sector shape, and a flow blocking part are distributed circumferentially around the central blind hole 31 of the rotatable valve plate 3. Specifically, the flow blocking part includes a first blind hole 34, a second blind hole 35, and a first separation beam 34 disposed between the first blind hole 34 and the second blind hole 35. A second separation beam 37 is disposed between the first blind hole 34 and the drainage blind hole 33. The drainage blind hole 33, the first blind hole 34, and the second blind hole 35 are coaxial with the central blind hole 31. The drainage blind hole 33 is connected to the central blind hole 31. A central angle of the second blind hole is 60° which is equal to the central angle of the drainage blind hole 33 and the central angle of the blind chamber 15. A central angle of the water inlet through hole is 150° which is equal to a central angle of the first through hole 23, a central angle of the flow blocking part, and a central angle of the second through hole 24. The water inlet through hole 32 penetrates the rotatable valve plate 3 along an axial direction of the valve body 1, and the water inlet through hole 32 penetrates a circumferential surface of the rotatable valve plate 3 along a radial direction of the valve body 1. A horizontal sectional area of the flow blocking part is equal to a sum of a horizontal sectional area of the first through hole 23 and a horizontal sectional area of the second through hole 24. The horizontal sectional area of the water inlet through hole 32 is equal to a sum of the horizontal sectional area of the first through hole 23 and a horizontal sectional area of a circumferential wall of the first through hole 23. When the rotatable valve plate 3 is installed above the fixed valve plate 2, the central blind hole 31 is connected to the central drainage chamber 12 through the central through hole 22.

The multifunctional filter valve of the disclosure has a normal operation mode, a backward washing mode, and a forward washing mode. The driving device 4 is configured to drive the rotatable valve plate 3 to cooperate with the fixed valve plate 2 to switch different modes.

Figure 10:
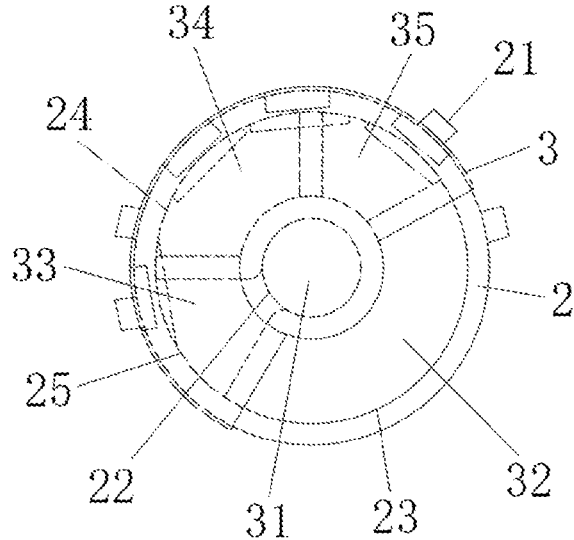
FIG. 10 illustrates a diagram of a relative position relationship between the rotatable valve plate and the fixed valve plate when the multifunctional filter valve of the disclosure is in a normal operation mode.

A working process of the multifunctional filter valve is as follows:

As shown in FIG. 9 and FIG. 10, when the multifunctional filter valve is in the normal operation mode, a valve connected to the water outlet 6 is opened; the water inlet through hole 32 of the rotatable valve plate 3 is connected to the first through hole 23 of the fixed valve plate; the flow blocking part of the rotatable valve plate 3 corresponds to the second through hole 24 of the fixed valve plate 2; and the drainage blind hole 33 of the rotatable valve plate 3 corresponds to the blind plate 25 of the fixed valve plate 2 in position. Furthermore, raw water enters into the outer chamber 11 of the valve body 1 from the water inlet 5; the raw water sequentially passes through the water inlet through hole 32, the first through hole 23, and the working chamber 13; then the raw water enters into a tank body connected to the valve body 1 through the first filter element interface 16. The tank body is provided with a filter layer such as activated carbon or quartz sand for water purification, and purified water is produced after the raw water is processed by the filter layer. The purified water sequentially passes through a central pipe of the tank body, the second filter element interface 17, and the backward washing chamber 14, and finally the purified water flows out from the water outlet 6, thereby achieving the normal operation of the multifunctional filter valve.

Figure 11:
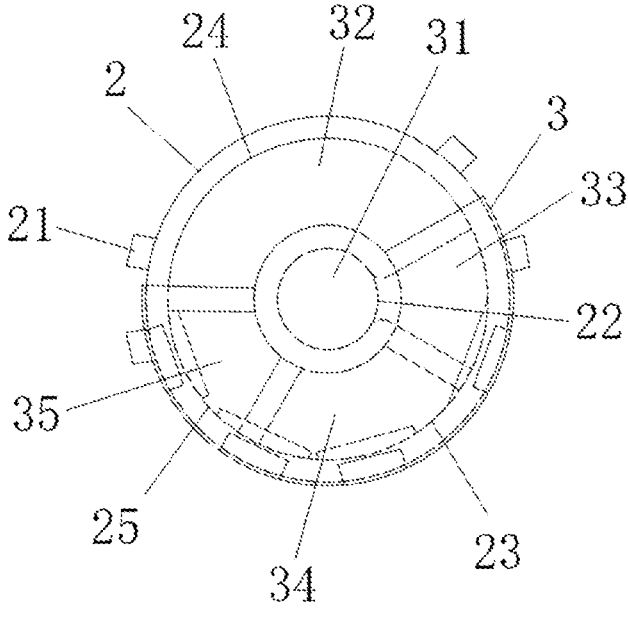
FIG. 11 illustrates a diagram of a relative position relationship between the rotatable valve plate and the fixed valve plate when the multifunctional filter valve of the disclosure is in a backward washing mode.

As shown in FIG. 7 and FIG. 11, when the multifunctional filter valve is in the backward washing mode, the valve connected to the water outlet 6 is closed, and the driving device 4 drives the rotatable valve plate 3 to rotate counterclockwise by 150° (relative to the position of the rotatable valve plate 3 in the normal operation mode). The water inlet through hole 32 of the rotatable valve plate 3 is connected to the second through hole 24 of the fixed valve plate 2. The second blind hole 35 corresponds to the blind plate 25 in position. The first blind hole 34 and the drainage blind hole 33 correspond to the first through hole 23 in position. Furthermore, water enters into the outer chamber 11 of the valve body 1 from the water inlet 5; the water sequentially passes through the water inlet through hole 32, the second through hole 24, and the backward washing chamber 14; then the water enters into a central pipe of a tank body connected to the valve body 1 along the second filter element interface 17; a filter layer in the tank body is flushed by the water from bottom to top, and thus waste water is produced; the waste water enters into the working chamber 13 from the first filter element interface 16, the waste water sequentially passes through the first through hole 23, the drainage blind hole 33, the central blind hole 31, and the central through hole 22 to enter into the central drainage chamber 12, and finally the waste water is discharged through the drainage outlet 7 to achieve the backward washing of the multifunctional filter valve.

Figure 12:
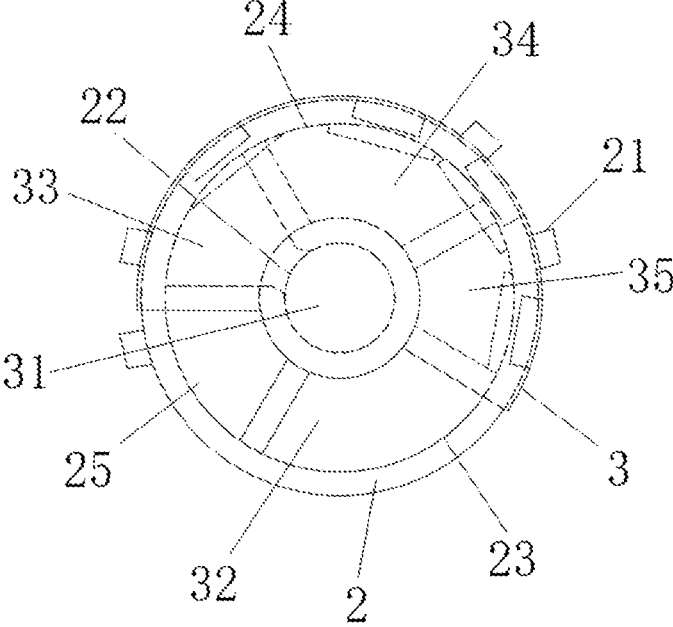
FIG. 12 illustrates a diagram of a relative position relationship between the rotatable valve plate and the fixed valve plate when the multifunctional filter valve of the disclosure is in a forward washing mode

As shown in FIG. 7 and FIG. 12, when the multifunctional filter valve is in the forward washing mode, the valve connected to the water outlet 6 is closed; the driving device 4 drives the rotatable valve plate 3 to rotate counterclockwise by 300° (relative to the position of the rotatable valve plate 3 in the normal operation mode); a part of the water inlet through hole 32 of the rotatable valve plate 3 is blocked by the blind plate 25, and another part of the water inlet through hole 32 is connected to a part of the first through hole 23 of the fixed valve plate 2; another part of the first through hole 23 corresponds to the second blind hole 35; the drainage blind hole 33 and first blind hole 34 corresponds to the second through hole 24. Furthermore, water enters into the outer chamber 11 of the valve body 1 from the water inlet 5, then the water sequentially passes through the water through hole 32, the first through hole 23, and the working chamber 13; the water enters into a tank body through the first filter element interface 16, and a filter layer of the tank body is flushed by the water from top to bottom, thereby producing waste water; the waste water enters into the backward washing chamber 14 through the second filter element interface 17, the waste water sequentially passes through the second through hole 24, the drainage blind hole 33, the central blind hole 31, and the central through hole 22 to enter into the central drainage chamber 12, and finally the waste water is discharged through the drainage outlet 7, thereby achieving the forward washing of the multifunctional filter valve.

It can be understood that, although the central angle of the first through hole 23 of the fixed valve plate 2 is 150° and equal to the central angle of the second through hole 24, and the central angle of the blind plate 25 is 60° in the above embodiment, these do not intend to limit the central angles of the first through hole 23, the second through hole 24 and the blind plate 25. In other embodiments, the central angle of the first through hole 23 of the fixed valve plate 2 may be 170° and equal to the central angle of the second through hole 24, and the central angle of the blind plate 25 may be 20°. In other embodiments, the central angle of the first through hole 23 may be 130° and equal to the central angle of the second through hole 24, and the central angle of the blind plate 25 may be 100°. Correspondingly, the center angles of the working chamber 13, backward washing chamber 14, and blind chamber 15 of the inner chamber are adjusted, as well as the center angles of the water inlet through hole 32, the drainage blind hole 33, the first blind hole 34, and the second blind hole 35 of the rotatable valve plate 3. To sum up, the center angle of the first through hole 23 is equal to the center angle of the second through hole 24, the center angle of the first through hole 23 is greater than 120° but less than 180°, and the center angle of the blind plate 25 is greater than 0° but less than 120°.

It can be understood that, in the above embodiment, the flow blocking part includes the first blind hole 34, the second blind hole 35, and the first separation beam 36 disposed between the first blind hole 34 and the second blind hole 35. The structure of the flow blocking part is not limited to this, in other embodiments, the flow blocking part may be a blind block, and the blind block is attached to a lower end face of the fixed valve plate 2 when the rotatable valve plate 3 is installed on the fixed valve plate 2.

It can be understood that, in the above embodiment, the water inlet through hole 32 of the rotatable valve plate 3 penetrates the rotatable valve plate 3 along an axial direction of the valve body 1, and the water inlet through hole 32 penetrates a circumferential surface of the rotatable valve plate 3 along a radial direction of the valve body 1. The water inlet through hole 32 is not limited to this, in other embodiments, the water inlet through hole 32 penetrates the rotatable valve plate 3 along an axial direction of the valve body 1, the water inlet through hole 32 penetrates the circumferential surface of the rotatable valve plate 3 along a radial direction of the valve body 1, and the horizontal sectional area of the water inlet through hole 32 is equal to the horizontal sectional area of the first through hole 23.

Embodiment 2

The difference from the above embodiment is that the multifunctional filter valve is not provided with a fixed valve plate 2. The rotatable valve plate 3 is directly and rotatably disposed at the upper part of the inner chamber. A horizontal sectional area of the rotatable valve plate 3 is equal to a horizontal sectional area of the inner chamber, and the rotatable valve plate 3 is matched with the top end surface of the inner chamber. The central angle of the water inlet through hole 32 of the rotatable valve plate 3 is 150° and equal to the central angle of the flow blocking part, and the central angle of the drainage blind hole 33 is 60°. The central angle of the water inlet through hole 32 of the rotatable valve plate 3 is equal to the central angle of the working chamber 13, the central angle of the flow blocking part, and the central angle of the backward washing chamber 14. The central angle of the second blind hole 35 is equal to the central angle of the drainage blind hole 33 and central angle of the blind chamber 15. A horizontal sectional area of the water inlet through hole 32 of the rotatable valve plate 3 is equal to a horizontal sectional area of the working chamber 13, a horizontal sectional area of the flow blocking part, and a horizontal sectional area of the backward washing chamber 14. A sum of the horizontal sectional area of the drainage blind hole 33 and horizontal sectional areas of the separation beams on both sides is equal to the horizontal sectional area of the blind chamber 15.

The multifunctional filter valve in the embodiment also has a normal operation mode, a backward washing mode, and a forward washing mode. The driving device 4 drives the rotatable valve plate 3 to rotate, thereby enabling the rotatable valve plate 3 to cooperate with the inner chamber to switch the different modes.

A working process of the multifunctional filter valve is as follows:

As shown in FIG. 2 and FIG. 8, when the multifunctional filter valve is in the normal operation mode, the valve connected to the water outlet 6 is opened; the water inlet through hole 32 of the rotatable valve plate 3 is connected to the working chamber 13 of the inner chamber, the flow blocking part of the rotatable valve plate 3 corresponds to the backward washing chamber 14 in position, and the drainage blind hole 33 of the rotatable valve plate 3 corresponds to the blind chamber 15 in position. Raw water enters into the outer chamber 11 of the valve body 1 from the water inlet 5, the raw water sequentially passes through the water inlet through hole 32 and the working chamber 13; then the raw water enters into a tank body connected to the valve body 1 along the first filter element interface 16. The tank body is provided with a filter layer such as activated carbon or quartz sand for water purification, and purified water is produced after the raw water is processed by the filter layer. The purified water sequentially passes through a central pipe of the tank body, the second filter element interface 17, and the backward washing chamber 14, and finally the purified water flows out from the water outlet 6, thereby achieving the normal operation of the multifunctional filter valve.

When the multifunctional filter valve is in the backward washing mode, the valve connected to the water outlet 6 is closed, and the driving device 4 drives the rotatable valve plate 3 to rotate counterclockwise by 150° (relative to the position of the rotatable valve plate 3 in the normal operation mode). The water inlet through hole 32 of the rotatable valve plate 3 is connected to the backward washing chamber 14, and the second blind chamber 35 corresponds to the blind chamber 15 in position. The first blind hole 34 and the drainage blind hole 33 corresponds to the working chamber 13 in position. Furthermore, water enters in to the outer chamber 11 of the valve body 1 from the water inlet 5, and the water sequentially passes through the water inlet through hole 32 and the backward washing chamber 14; then the water enters into a central pipe of a tank body connected to the valve body 1 through the second filter element interface 17; a filter layer in the tank body is flushed by the water from bottom to top, and thus waste water is produced; the waste water enters into the working chamber 13 from the first filter element interface 16, the waste water sequentially passes through the drainage blind hole 33 and the central blind hole 31 to enter into the central drainage chamber 12, and finally the waste water is discharged through the drainage outlet 7 to achieve the backward washing of the multifunctional filter valve.

When the multifunctional filter valve is in the forward washing mode, the valve connected to the water outlet 6 is closed. The driving device 4 drives the rotatable valve plate 3 to rotate counterclockwise by 300° (relative to the position of the rotatable valve plate 3 in the normal operation mode). A part of the water inlet through hole 32 of the rotatable valve plate 3 is blocked by the blind chamber 15, another part of the water inlet through hole 32 is connected to a part of the working chamber 13, and another part of the working chamber 13 corresponds to the second blind hole 35 in position. The drainage blind hole 33 and the first blind hole 34 correspond to the backward washing chamber 14 in position. Furthermore, water enters into the outer chamber 11 of the valve body 1 from the water inlet 5, then the water sequentially passes through the water inlet through hole 32 and the working chamber 13. Then the water enters into a tank body through the first filter element interface 16, and a filter layer of the tank body is flushed by the water from top to bottom, thereby producing waste water; the waste water enters into the backward washing chamber 14 through the second filter element interface 17, the waste water sequentially passes through the drainage blind hole 33 and the central blind hole 31 to enter into the central drainage chamber 12, and finally the waste water is discharged through the drainage outlet 7, thereby achieving the forward washing of the multifunctional filter valve.

The above are only some embodiments of the disclosure and are not intended to limit the disclosure. Any modifications, equivalent replacements, improvements, etc. made within the spirit and principles of the disclosure should be included in the scope of protection of the disclosure.

What is claimed is:

1. A multifunctional filter valve, comprising a valve body, a rotatable valve plate, and a driving device;

wherein a water inlet, a water outlet, and a drainage outlet are disposed on a side wall of the valve body; the water outlet is configured to connect to a valve; an inner chamber and an outer chamber are coaxially defined in the valve body, and the inner chamber is disposed to separate from the outer chamber; the outer chamber is connected to the water inlet; the inner chamber comprises a central drainage chamber, a working chamber, a backward washing chamber, and a blind chamber; the working chamber, the backward washing chamber, and the blind chamber are distributed circumferentially around the central drainage chamber; the central drainage chamber is connected to the drainage outlet; the backward washing chamber is connected to the water outlet; a first filter element interface and a second filter element interface are coaxially disposed at a bottom of the valve body; the first filter element interface is connected to the working chamber; and the second filter element interface is connected to the backward washing chamber; and the rotatable valve plate is coaxially disposed above the inner chamber; the driving device is connected to the rotatable valve plate and is configured to drive the rotatable valve plate to rotate in the valve body; a center of the rotatable valve plate is provided with a central blind hole; a water inlet through hole, a drainage blind hole in an annular sector shape, and a flow blocking part in an annular sector shape are distributed circumferentially around the central blind hole of the rotatable valve plate; the drainage blind hole and the flow blocking part are coaxial with the central blind hole; the central blind hole is connected to the central drainage chamber; the drainage blind hole is connected to the central blind hole; a central angle of the drainage blind hole is not greater than a central angle of the blind chamber; a central angle of the flow blocking part is equal to a central angle of the water inlet through hole, a central angle of the working chamber, and a central angle of the backward washing chamber.

2. The multifunctional filter valve as claimed in claim 1, wherein the flow blocking part comprises a first blind hole, a second blind hole, and a first separation beam disposed between the first blind hole and the second blind hole; a second separation beam is disposed between the first blind hole and the drainage blind hole; and a central angle of the second blind hole is equal to the central angle of the drainage blind hole.

3. The multifunctional filter valve as claimed in claim 2, wherein the multifunctional filter valve further comprises a fixed valve plate, and the fixed valve plate is coaxially fixed at a top of the inner chamber; the rotatable valve plate is disposed above the fixed valve plate, and the rotatable valve plate is configured to rotate relative to the fixed valve plate to match the fixed valve plate; a central through hole is defined at a center of the fixed valve plate; a first through hole in an annular sector shape, a second through hole in an annular sector shape, and a blind plate in an annular sector shape are coaxially disposed around the central through hole; the central through hole is connected to the central drainage chamber; the first through hole is connected to the first filter element interface; the second through hole is connected to the second filter element interface; a central angle of the blind plate is equal to the central angle of the blind chamber, and the blind plate is disposed to correspond to the blind chamber in position.

4. The multifunctional filter valve as claimed in claim 3, wherein a horizontal sectional area of the first through hole is equal to a horizontal sectional area of the water inlet through hole; a horizontal sectional area of the second through hole is equal to a horizontal sectional area of the flow blocking part; and a horizontal sectional area of the blind plate is equal to a horizontal sectional area of the blind chamber.

5. The multifunctional filter valve as claimed in claim 4, wherein the central angle of the blind plate is greater than 0° and less than 120°; a central angle of the first through hole is equal to a central angle of the second through hole, and the central angle of the first through hole is greater than 120° and less than 180°; and a sum of the central angle of the blind plate, the central angle of the first through hole, and the central angle of the second through hole is 360°.

6. The multifunctional filter valve as claimed in claim 5, wherein the central angle of the blind plate is 60°, the central angle of the first through hole is 150°, and the central angle of the second through hole is 150°.

7. The multifunctional filter valve as claimed in claim 1, wherein the water inlet through hole penetrates the rotatable valve plate along an axial direction of the valve body, and the water inlet through hole penetrates a circumferential surface of the rotatable valve plate along a radial direction of the valve body.

8. The multifunctional filter valve as claimed in claim 3, wherein the first through hole is disposed to correspond to the working chamber and the first filter element interface in position; and the second through hole is disposed to correspond to the backward washing chamber and the second filter element interface in position.

9. A multifunctional filter valve, comprising a valve body, a rotatable valve plate, a fixed valve plate, and a driving device;

wherein the driving device is disposed on the valve body; an outer wall of the valve body is provided with a water inlet, a water outlet, and a drainage outlet; an inner chamber and an outer chamber are defined in the valve body, the inner chamber is coaxial with the outer chamber and is separated from the outer chamber in a radial direction of the valve body, and the outer chamber is in communication with the water inlet;

the inner chamber defines a central drainage chamber, a working chamber, a backward washing chamber, and a blind chamber; the working chamber, the backward washing chamber, and the blind chamber are defined around the central drainage chamber; the central drainage chamber is in communication with the drainage outlet; and the backward washing chamber is in communication with the water outlet;

a first filter element interface and a second filter element interface are coaxially defined at a bottom of the valve body; the first filter element interface is in communication with the working chamber; and the second filter element interface is in communication with the backward washing chamber;

a center of the rotatable valve plate is provided with a central blind hole; a water inlet through hole, a drainage blind hole in an annular sector shape, and a flow blocking part in an annular sector shape are distributed circumferentially around the central blind hole of the rotatable valve plate; the drainage blind hole and the flow blocking part are coaxial with the central blind hole; the central blind hole is in communication with the central drainage chamber; the drainage blind hole is in communication with the central blind hole; a central angle of the drainage blind hole is not greater than a central angle of the blind chamber; a central angle of the flow blocking part is equal to a central angle of the water inlet through hole, a central angle of the working chamber, and a central angle of the backward washing chamber; and the fixed valve plate is fixed at a top of the inner chamber, the rotatable valve plate is disposed on the fixed valve plate and is proximate to the driving device, and the driving device is configured to drive the rotatable valve plate to rotate to cooperate with the fixed valve plate; a central through hole is defined at a center of the fixed valve plate; a first through hole in an annular sector shape, a second through hole in an annular sector shape, and a blind plate in an annular sector shape are coaxially disposed around the central through hole; the central through hole is in communication with the central drainage chamber; the first through hole is communication with the first filter element interface; the second through hole is communication with the second filter element interface; a central angle of the blind plate is equal to the central angle of the blind chamber, and the blind plate is disposed to correspond to the blind chamber in position.

* * * * *